United States Patent [19]

Pryor

[11] Patent Number: 4,862,397

[45] Date of Patent: * Aug. 29, 1989

[54] REMOTE OPERATION OF OPTICAL SYSTEM

[75] Inventor: Timothy R. Pryor, Tecumseh, Canada

[73] Assignee: Diffracto Ltd., Windsor, Canada

[*] Notice: The portion of the term of this patent subsequent to Sep. 8, 2004 has been disclaimed.

[21] Appl. No.: 89,836

[22] Filed: Aug. 27, 1987

Related U.S. Application Data

[62] Division of Ser. No. 454,989, Jan. 3, 1983, Pat. No. 4,692,884.

[51] Int. Cl.[4] ............................................. G06F 3/14
[52] U.S. Cl. ............................ 364/571.01; 250/205
[58] Field of Search ............... 364/571.05, 571.01, 364/573, 551.01, 552, 525; 250/204, 205; 340/793; 358/107

[56] References Cited

U.S. PATENT DOCUMENTS

| | | | |
|---|---|---|---|
| 4,228,515 | 10/1980 | Genna et al. | 364/571 |
| 4,298,944 | 11/1981 | Stout et al. | 364/575 |
| 4,573,122 | 2/1986 | Inbar et al. | 364/414 |
| 4,670,659 | 6/1987 | Loose | 250/560 |
| 4,692,884 | 9/1987 | Pryor | 364/573 |

Primary Examiner—Parshotam S. Lall
Assistant Examiner—S. A. Melnick
Attorney, Agent, or Firm—Larson & Taylor

[57] ABSTRACT

A method and apparatus for controlling a detector array based optical system using reflected or transmitted light for machine vision is disclosed. The light characteristic such as power (intensity) or distribution of power received by said optical system is detected and an electrical signal indicative of the characteristic is transmitted to a remote control system. The control system then adjusts a light power related variable of the optical system when the received light characteristic signal is deficient. A method and apparatus for linearizing the output of a diode array is also disclosed. An element correction array is set up in a microprocessor and an encoding device providing precise edge movement data is moved past the elements of the diode array so that the data from the encoder and from the diode array can be compared and the difference inputted as offset values for the corresponding positions of the elements in the correction array. Thereafter, during operation, the offset values are added to the diode array element reading to obtain a corrected diode array output which is substantially linear.

21 Claims, 1 Drawing Sheet

REMOTE OPERATION OF OPTICAL SYSTEM

This is a division of application Ser. No. 454,989 filed Jan. 3, 1983, now USP 4,692,884.

FIELD OF THE INVENTION

The present invention relates generally to the operation of vision for machines, and more particularly to a control system and output linearization of optical detector arrays.

BACKGROUND OF THE INVENTION

Detector array based optical systems for industrial inspection and machine guidance (machine vision) have been utilized. However, some problems do exist. A major problem is often related to light power. This is caused by a number of problems such as degradation of the lamps and accumulation of dirt or debris on windows, optics, parts, and others. Problems of this sort can be solved by building observed light power detectors into the system to compensate lamp power, array intergration time, or scan rate as a function of detected power through the window by the sensor unit.

However, many times the source of error also couples with a change in the object being viewed. For example, where a part is being viewed by the machine, the part color can change due to a different casting supplier, parts running oily, or a faulty parts washer which leaves dirt or a wash residue on the part. In such situations, it is not sufficient to make a simple light level change since it is not known what the correct reflecting light level from the part should be. For example, if an operator uses a clean and dry master which is shiny to set the control system for the optical sensor, and the parts are dull, dirty or wet, incorrect settings of the optical system result.

In large range dimensional optical sensors, the sensor output is often nonlinear. It is therefore necessary to calibrate this output to determine the correct dimension. This is often difficult to do.

SUMMARY OF THE INVENTION

In accordance with the present invention, a method and apparatus for controlling a detector array based optical system for machine vision is disclosed. The light characteristic such as power (intensity) or spacial distribution of power received by the array based optical system is detected and an electrical signal indicative of this light power is transmitted to a remotely located control system. When the received light characteristic signal is deficient, the control system adjusts a suitable light variable of the optical system so that a sufficient light characteristic signal is achieved.

Typically, the optical system variable which is adjusted is selected from the detector array scan rate, the array integration time, or the light output level. In addition, the diode array calibration points, the diode array threshold limit, the diode array dump timing, the measurement limits of the optical system, and the color sensitivity are also light power output variables which can be adjusted by the control system. The control system can also adjust the movement of the object which is being viewed by the optical system by changing the rate of movement or the dwell time of the object. A blow-off device for the window of the array or the object being detected can also be controlled by the control system to remove debris which is adversely affecting the light characteristic.

In the preferred embodiment the control system includes a computer which is suitably programmed to perform the desired adjustments. This computer program is remotely located from the detecting array and can be connected over telephone lines if it is desired to locate the control system in a separate building, or at a vendor plant in a distant city for example.

In order to linearize the output of a diode array, a microprocessor has a memory in which an element correction array corresponding to the diode array is provided. An encoding device is used to input precise edge movement data to the microprocessor as an object is moved past the elements of the diode array. The data from the encoding device and the diode array at each element are compared and the difference is inputted into the microprocessor as offset values at the corresponding positions in the element correction array. Thereafter, the correction array offset value is added to each corresponding diode array element reading during operation of the system. This produces a substantially linear output from the diode array. Conveniently, the microprocessor is remotely located from the diode array and signals are transmitted between the two. The linearization data in the correction array can be recalculated periodically by a signal from the remotely located microprocessor.

With the present invention, the remote operation of an optical system can be advantageously effected by skilled personnel quickly and efficiently. In addition, the control system disclosed incorporates many maintenance features into the optical system which allow easy trouble shooting with the computer via remote telephone lines.

Other features and advantages of the present invention are stated in or are apparent from a detailed description of presently preferred embodiments of the invention found hereinbelow.

DETAILED DESCRIPTION OF THE PREFERRED EMBODIMENT

Figure 1:
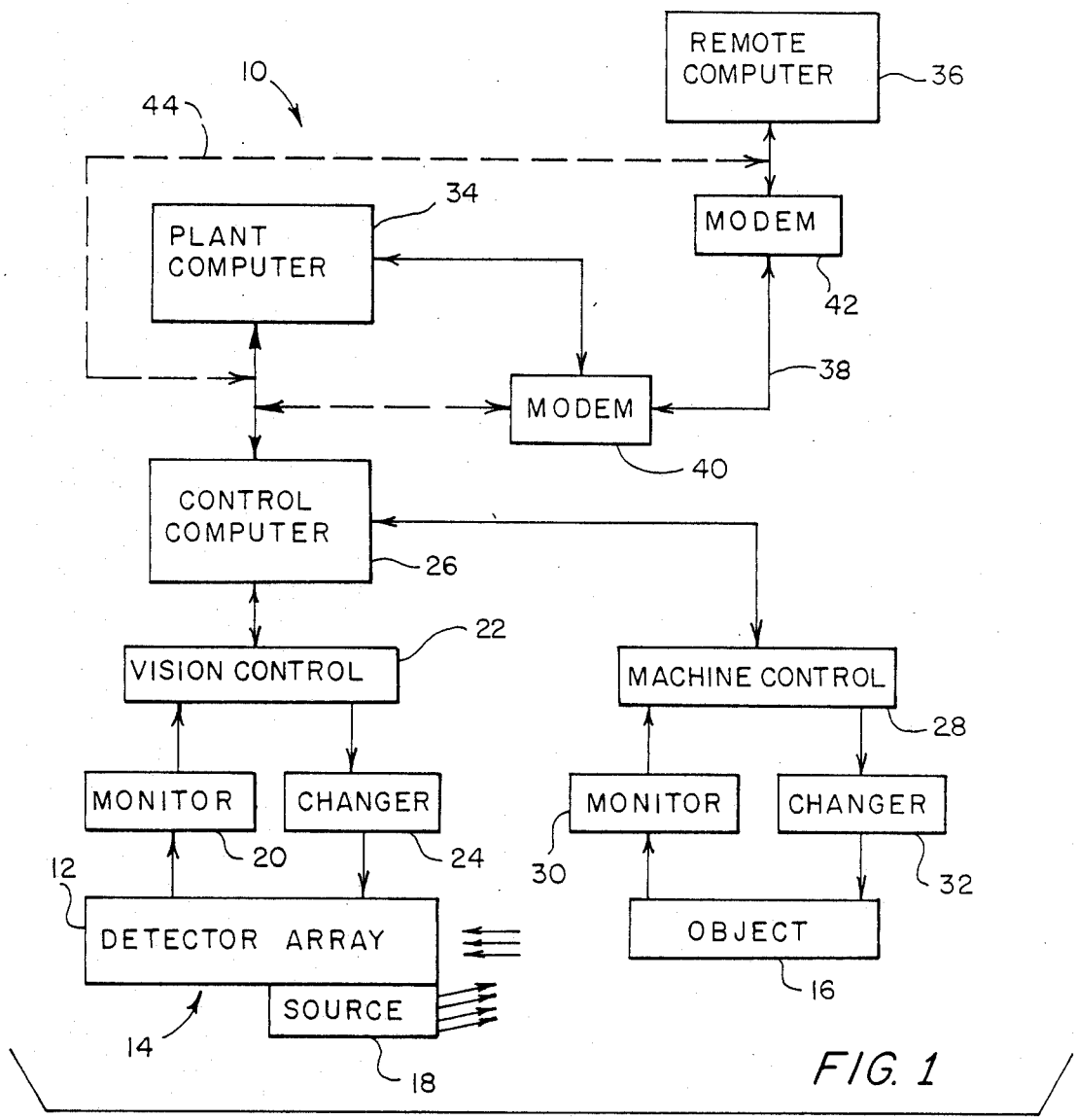
FIG. 1 is a schematic representation of a control system for a detector array based optical system according to the present invention.

With reference now to the drawings in which like numerals represent like elements, a control system 10 for a detector array 12 of an optical system 14 is disclosed. Optical system 14 is, typically, used for machine vision in an industrial operation where an object 16 is detected by array 12 using light from a source 18 reflected off object 16.

Associated with detector array 12 is a monitor 20 which monitors one or more characteristics of detector array 12, and the associated system. Among these characteristics are: light power of light source 18, received light power, array clock rate, array integration time, array calibration points, array threshold levels, array dump timing, measurement limits, and (if applicable) camera color sensitivity settings. Monitor 20 is connected to a vision control 22 for optical system 14. Vision control 22 is also connected to a changer means 24 which is capable of changing any of the monitored characterisitcs. Vision control 22 is further connected to a control computer 26 which controls the operation of vision control 22.

Control computer 26 may also be connected to a machine control 28 which controls the movement of object 16. A monitor 30 is connected to machine control 28 and is used to monitor characteristics relating to the movement of object 16. Among these characteristics monitored are rate of movement and dwell at a station. Also connected to machine control 28 is a changer mean 32 which is capable of changing the characteristics monitored by monitor 30.

In a large industrial operation, control computer 26 is conveniently connected to a central plant computer 34. Plant computer 34 is used to control the operation of a number of related operations including the operation controlled by control computer 26. Plant computer 34 is in turn connected to a remote computer 36. Remote computer 36 can conveniently be located a large distance from plant computer 34 for example, from a host plant where highly skilled personnel monitor the operation of plant computer 34 and optical system 14 in particular. Conveniently, this is done over telephone lines 38 by use of modems 40 and 42. It should also be realized that remote computer 36 can be directly attached to control computer 26, bypassing plant computer 34, by use of a line 44 where remote computer 36 is in the same building as control computer 26, or via line 46 attached to modem 40.

In operation, control system 10 functions in the following manner. Initially, monitor 20 is used to monitor the light power or distribution of power received by detector array 12 from light reflected off of object 16 and originating at light source 18. A signal indicative of received light power is then transmitted to vision control 22, control computer 26, and ultimately to remote computer 36. As discussed above, a number of factors can cause the received light power to fall below a desired level. Among these factors are a change in light source power or distribution due to age or replacement, or a change in object 16 such as a color change, oil on object 16, or dirt or wash residue which should not be present on object 16. Therefore, even though the light power received by detector array 12 is less than desired, it may be that the operation of optical system 14 is still possible but some of the characteristics need to be changed. Therefore, remote computer 36 is activated to change one or more characteristics of detector array 12 via changer means 24, or the machine via changer means 32. Conveniently, a diagnostic program in remote computer 36 actually trouble shoots optical system 14 and makes the appropriate changes to the characteristics which are appropriate. It should be noted that the location of remote computer 36 in, for example, a host plant allows a highly skilled person to take immediate action to make the changes necessary which may solve the problem. The changes necessary can be effected through vision control 22 or machine control 28 as described above.

By way of example, consider the case where object 16 has some amount of dirt or the like on its surface. This dirt causes the reflected light from light source 18 to be decreased and the received light power at detector array 12 is subsequently much reduced. As monitor 20 senses this, a signal is sent to vision control 22, control computer 26, and ultimately to remote computer 36. Upon receipt of this signal, remote computer 36 attempts to correct the problem by changing one or more of the light power output or detector array characteristics. In order to solve this problem, the intergration time of detector array 12 could be varied. In addition, the scan widths or threshold limits could be opened up to allow operation to continue until changes are made in object 16.

Besides dirt on object 16, it is also possible for dirt or debris to accumulate on the window of detector array 12. If such a situation is likely, changer means 24 and 32 could also control blow-off devices which would direct a jet of air against the window of detector array 12 or object 16, respectively. This could be the first remedial action attempted by remote computer 36 upon the receipt of a low power output signal.

By use of control system 10, it is possible to detect the light power received and to change or adjust various light characteristic variables as necessary. In addition, control system 10 is also advantageously used to reset the light characteristic variables at the beginning of each day's production. This is done be running a few characteristic objects 16 from the day's production through optical system 14 to get a signature of object 16. Remote computer 36 then sets the various light power output variables at the optimal values. All this could be done locally at optical system 14 by use of twisting pots or the like, but the use of remote computer 36 allows such changes to be made automatically with the use of diagnostic programs which are more effecient and which actually make the changes themselves. In addition, remote computer 36 continues to monitor the light power output and to make any subsequent changes which may be necessary.

It should also be appreciated that the use of a remote computer 36 allows one to have a completely automated system, whereby all of the inspection and robot camera sensors in a particular system which depend on light level can be set automatically by remote computer 36. While this is an extreme case, it does make possible the "fully computerized factory of the future".

Figure 2:
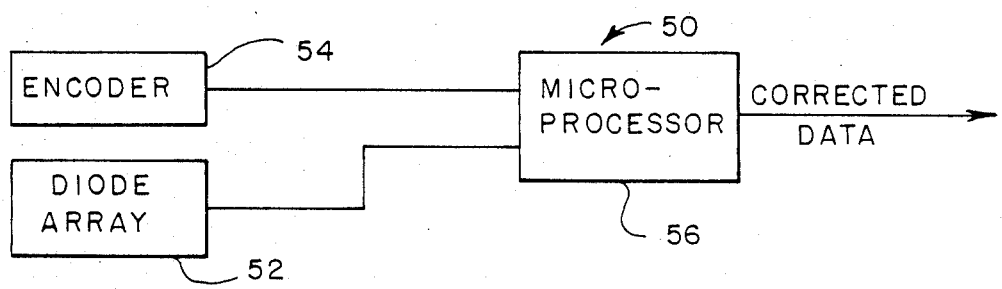
FIG. 2 is a schematic representation of an apparatus for linearizing the output of a diode array according to the present invention.

Depicted in FIG. 2 is an output linearization system 50 for a diode array 52. Linearization system 50 includes an encoder 54 which is operatively associated with diode array 52 and a remotely located microprocessor 56. Linearization system 50 is particularly useful with large range detector array systems in order to achieve maximum accuracy. In this context, it is highly desirable to analyze or vary the state of calibration of diode array 52 remotely.

Linearization system 50 functions in the following manner. Initially, the memory of microprocessor 56 is set up with an element correction array having the same number of array elements as diode array 52. For example, for a 1024 element sensor in diode array 52, a 1024 correction array is set up in microprocessor 56. Encoder 54 is then used to provide precise edge movement data as an object edge is moved through the field of view of diode array 52. Microprocessor 56 compares the data from encoder 54 with the data from the various elements of diode array 52. The difference between the two readings is the value by which the elements in diode array 52 are offset from having a linear output. This offset value for each element of diode array 52 is inputted into the corresponding element of the correction array in microprocessor 56. This completes the linearization process for diode array 52, which is performed as often as is necessary. It should be noted that this linearization is performed remotely, and can be performed by a microprocessor located in another plant by using suitable transmission means such as disclosed with respect to the embodiment described in FIG. 1.

After the calibrating procedure described above, in the gauging mode as an object is moved across the field of view of diode array 52, the elements of diode array 52 produce raw data which is fed to microprocessor 56. The location or elements from which the raw data originated is then determined and the corresponding element offset value in the element correction array in microprocessor 56 is then added to the raw data from each element. This causes the raw data from each element of diode array 52 to be corrected so that a linear data output is produced. This linearized data or corrected data is then outputted by microprocessor 56 to be further processed by the control system with which diode array 53 is associated.

It is further noted that the machine changer 32 may be used to slow down the part movement, produce longer dwell in station, etc. to allow more light to be received by the detector array within a given integration time making up for loss of light power due to dirty objects or windows for example. In addition, such a slowdown allows in general more scans to be made, increasing the chance of obtaining good data in the presence of contamination or other adverse variables.

It is also noted recalibration of detector arrays can also be done using the control system here described to suit new conditions such as light size change.

Note that "light" includes UV, IR and visible wavelengths of electro-magnetic radiation.

While the present invention has been described with respect to exemplary embodiments thereof, it will be understood by those of ordinary skill in the art that these and other variations and modifications can be effected within the scope and spirit of the invention.

I claim:

1. A control system for a detector array based optical system used for machine vision which optical system has a detector array which receives light from a plurality of succeedingly presented objects, comprising:
   a transmitting means for transmitting signals between a control device and the optical system;
   a detecting means for detecting a light characteristic of the light received by the detector array during use on a presented object and for transmitting a signal indicative of said light characteristic via said transmitting means to the control device; and
   an adjusting means for adjusting a light characteristic variable of said optical system for the succeeding objects when the received light characteristic for at least one of the previous objects is deficient.

2. A control system as claimed in claim 1 wherein said adjusting means adjusts a light characteristic variable which is one of detector array scan rate, integration time, and light output level of a light source.

3. A control system as claimed in claim 2 wherein said detecting means also detects and wherein said adjusting means also adjusts detector array calibrations.

4. A control system as claimed in claim 3 wherein said detecting means also detects and wherein said adjusting means also adjusts detector array threshold limits.

5. A control system as claimed in claim 4 wherein said detecting means also detects and wherein said adjusting means also adjusts the detector array dump timing.

6. A control system as claimed in claim 5 wherein said detecting means also detects and wherein said adjusting means also adjusts measurement limits of the optical system.

7. A control system as claimed in claim 5 wherein said optical system includes a color sensitivity camera, wherein said detecting means detects and said adjusting means adjusts the color sensitivity.

8. A control system as claimed in claim 2 wherein the machine vision is of a moving element, and wherein said detecting means also detects and said adjusting means also adjusts the rate at which the element moves.

9. A control system as claimed in claim 2 wherein the machine vision is of a moving element which is stopped for a period of time, and wherein said detecting means also detects and said adjusting means also adjusts the dwell time of the stopped element.

10. A control system as claimed in claim 2 wherein said adjusting means includes a blow-off means for directing a jet air against the window of the detector array to clean light obscuring debris from the window.

11. A control system as claimed in claim 10 wherein said blow-off means also directs a jet of air against an object being viewed to clean non light reflecting debris from the object.

12. A control system as claimed in claim 2 and further including computer means for initially receiving the detected light characteristic variables produced by a sample operation of the optical system and for determining appropriate values for the variables which are then automatically adjusted in the optical system by said adjusting means.

13. A control system as claimed in claim 12 wherein said transmitting means includes modem means for transmitting the signals over telephone lines from said detecting means to said adjusting means.

14. A method of controlling a detector array based optical system using light received by a detector array for machine vision from a plurality of succeedingly presented objects comprising the steps of:
   detecting a light characteristic of the light received by the detector array from a presented object during use;
   transmitting a signal indicative of the light characteristic to a remotely located control system; and
   adjusting a light characteristic variable of the optical system for succeeding objects when the received signal of at least one previous object is deficient.

15. A method of controlling an optical system as claimed in claim 14 wherein the light characteristic variable is one of detector array scan rate, integration time, and light power output level of a light source.

16. A method of controlling an optical system as claimed in claim 15 and further including the steps of initially operating the machine vision under sampling conditions to obtain sample light characteristic values and thereafter setting the light characteristic variables to accommodate these sampling values.

17. A method of linearizing the ouput of a detector array using a microprocessor comprising the step of:
   setting up an element correction array in the memory of the microprocessor corresponding to the detector array;
   inputting precise object movement data to the microprocessor from an encoding device as an object is moved past the elements of the detector array;
   comparing the data from the encoder with the data from the detector array at each array element and inputting an indication of the difference between the two sets of data as offset values at the corresponding positions in the element correction array; and during the operating mode of the detector array, modifying the corresponding element correction array offset value to each detector array element reading to obtain a corrected detector array output which is substantially linear.

18. A method of linearizing as claimed in claim 17 and further including the steps of remoting the microcomputer from the detector array; and transmitting the data to the microcomputer over suitable transmission lines.

19. A method of linearizing as claimed in claim 18 and further including the step of periodically recalculating the offset values remotely by a signal from the microprocessor.

20. An apparatus for linearizing the output of a detector array comprising:

a microprocessor having a memory in which an element correction array corresponding to the detector array is set up;

an encoding means for inputting precise object movement data to the microprocessor as an object is moved past the elements of the detector array;

a comparing means for comparing the data from said encoding means with the data from the detector array at each array element and for inputting an indication of this difference between the two sets of data as offset values at the corresponding positions in the element correction array; and a modifying means for modifying the corresponding element correction array offset valve to each detector array element reading during operation to obtain a corrected detector array output which is substantially linear.

21. An apparatus for linearizing as claimed in claim 20 wherein said microprocessor is remotely located from the diode array and further including a transmitting means for transmitting the data between the microprocessor and the diode array.

* * * * *